(No Model.) 2 Sheets—Sheet 2.
J. STEPHENSON.
REMOVABLE TRUCK FOR ELECTRIC CARS.
No. 424,371. Patented Mar. 25, 1890.
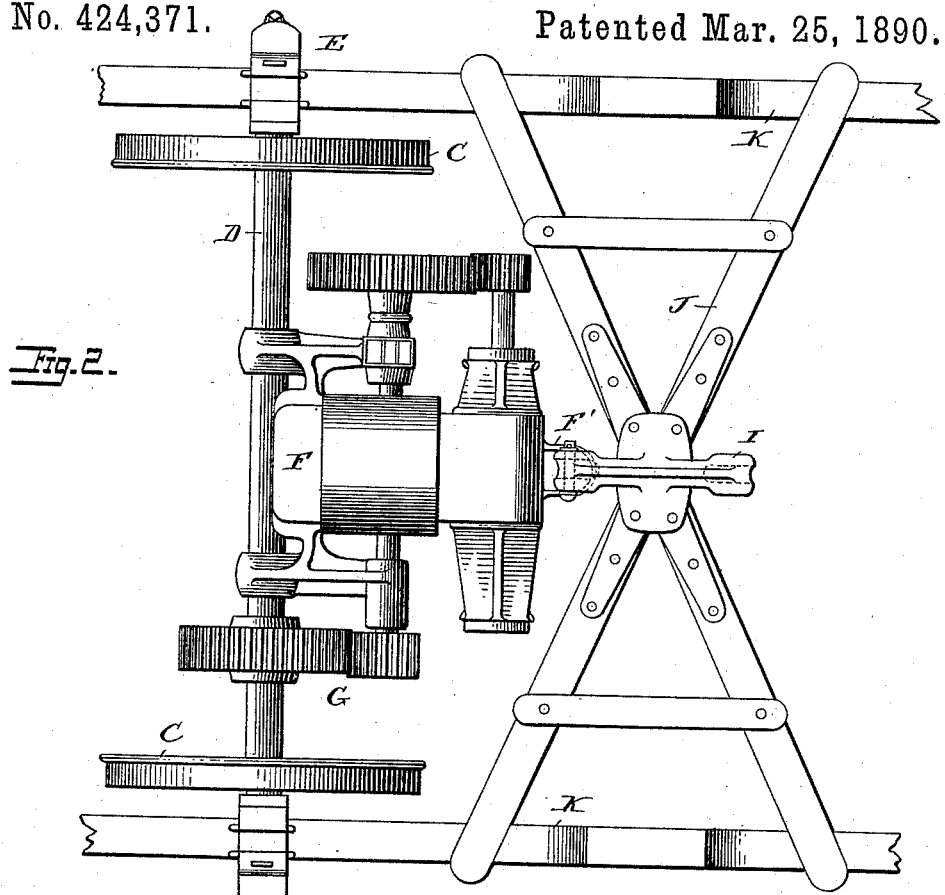
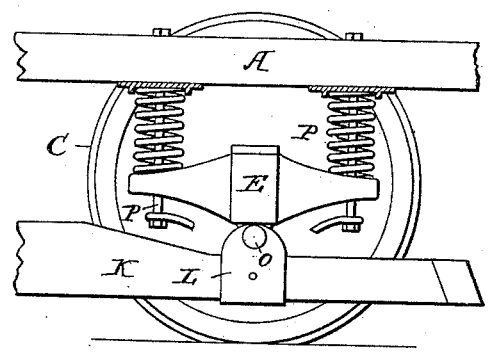
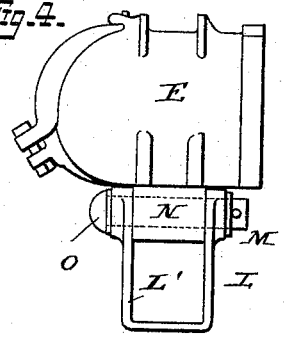
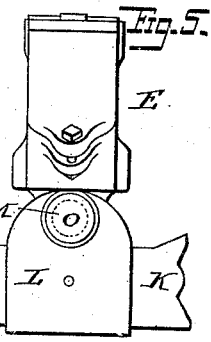
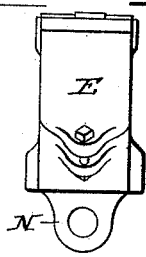
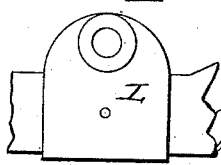
Witnesses
Jno. G. Hinkel
W. S. McArthur
Inventor
John Stephenson
by Foster S. Freeman
Attorneys
N. PETERS, Photo-Lithographer, Washington, D. C.

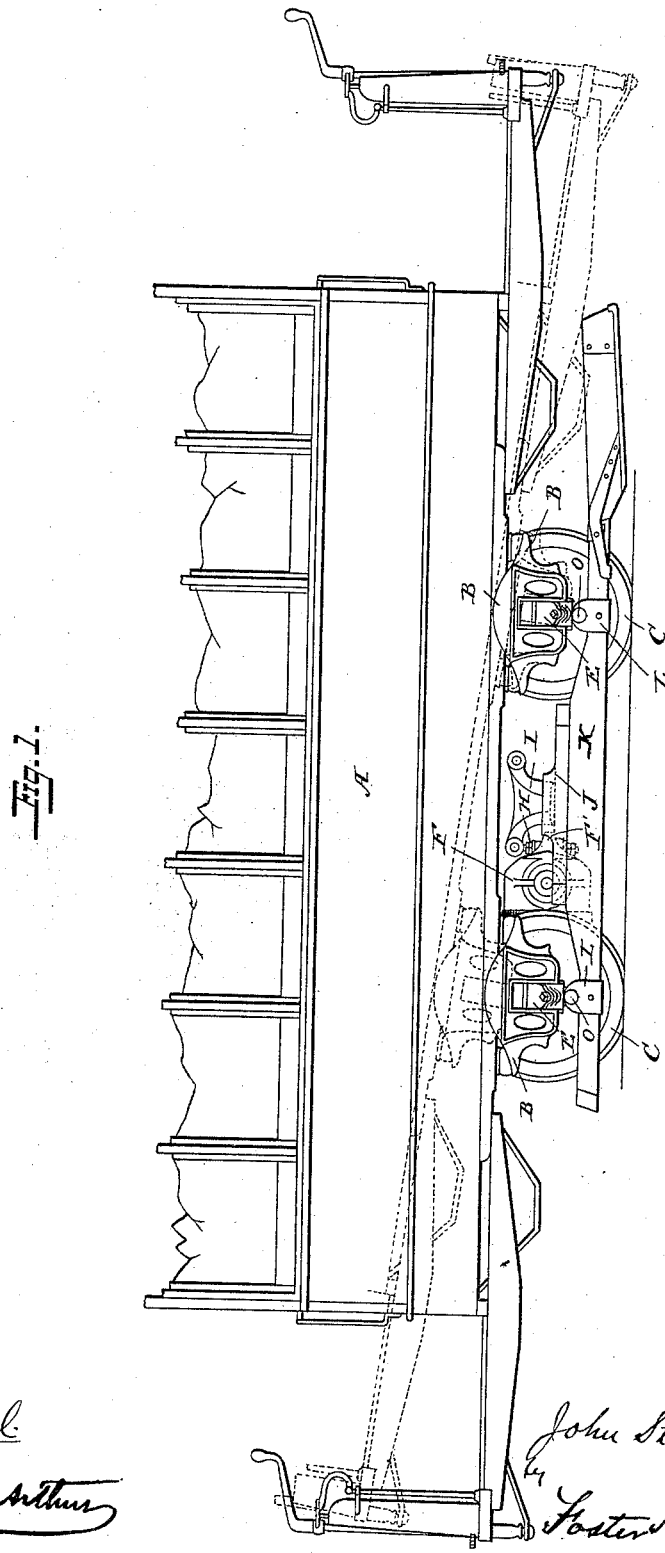

UNITED STATES PATENT OFFICE.

JOHN STEPHENSON, OF NEW YORK, N. Y.

REMOVABLE TRUCK FOR ELECTRIC CARS.

SPECIFICATION forming part of Letters Patent No. 424,371, dated March 25, 1890.

Application filed January 2, 1890. Serial No. 335,673. (No model.)

*To all whom it may concern:*

Be it known that I, JOHN STEPHENSON, a citizen of the United States, residing at New York, in the county and State of New York, have invented certain new and useful Improvements in Electric Cars with Trucks Removable, of which the following is a specification.

In the construction of cars adapted to be propelled by electricity it is common to provide one or more electro-motors and to connect them with the axle or axles of the wheels and to support them upon a truck below the body of the car. The use of electro-motors naturally increases the mechanism in the running-gear of a car, and consequently involves difficulties in making repairs when for any reason—such as a failure of the wheels or axles or motors—they are necessary. Owing to the rapidly-increasing travel on lines employing electric cars any delay caused by breakage or derangement of the running-gear of any particular car produces a corresponding delay in many other cars and impedes the rapidity and accuracy of travel to a great extent. It is therefore very desirable that facilities be provided for making these repairs on this class of cars, and it is one of the objects of my present invention to so construct the car that repairs may be speedily made and any broken or defective part may be quickly detached from the car or replaced by duplicates.

To this end my present invention consists, broadly stated, in connecting the body of a car with its truck by means of hinged joints, so that one or both ends of the car may be raised from the truck to permit the repairs or replacements of any injured or broken parts.

Referring to the accompanying drawings, Figure 1 is a side view of the portion of the body and truck of a car embodying my invention. Fig. 2 is a plan view of a portion of the truck of the car, the body being removed. Fig. 3 is a side view showing a different manner of connecting the car-body to the axle-boxes. Fig. 4 is a side view of the axle and stirrup connected by a hinged joint. Fig. 5 is an end view thereof, and Figs. 6 and 7 are front views showing the axle-box and stirrup detached.

The car-body A may be of any desired or usual construction and have secured to its sides the jaw-pedestals B in the usual and well-known way. The wheels C are mounted upon the axle D and provided with axle-boxes E, and the electro-motor F—one or more, as the case may be—is supported upon the axle on one side and connected by suitable gears G thereto, and the other end of the motor is supported upon the car-truck frame. In the present instance I have shown the nose-piece F' of the motor connected by means of pendant H to a double goose-neck I, mounted upon the X-shaped frame J, which is supported on the car-truck side sills K, which are connected by means of stirrups L to the car axle-box. The car-truck in this construction is suspended from the axle-boxes by means of a hinged joint M. This joint may be an attachment or appendage to the axle-box, although I prefer that the bottom of the box-shell should constitute the upper portion of the hinged joint, and therefore provide it with the projection N, extending below the shell. The lower part of the hinged joint is in the form of a stirrup L, open at the top and supporting one corner of the car-truck frame between its sides, and the sides L' are connected to the projection N by a hinged joint-bolt O, passing through the united parts and securing them together and allowing the parts to rotate as needed. It will be seen that this construction permits the car-axle to be inclined or rotated around the hinged joint when one end of the car-body is elevated, as indicated in dotted lines, the car tilting or rocking upon the hinged joint between the axle-boxes and stirrups at the other end of the car, and in this way the axle, wheels, and motor or any part thereof under the elevated end of the car may be readily removed and replaced by a perfect device. If, indeed, it is necessary to remove the motor, axle, and wheels together, it is only required to remove two hinged joint-bolts and disconnect the nose of the motor from the pendant by removing the nose-bolt, when they may be rolled from under the car and an entirely new motor, axles, and wheels replaced.

In Fig. 3 I have shown the car sill or body A connected to the axle-box E by what is termed the "post-gear" P, and in this instance the stirrup L is connected to the box E by a hinged joint, as before.

While I have shown the projection connecting the stirrup and its supporting axle-box made integral parts of the box-shell, it is evident that this is not a necessary feature of the construction, but that they could be connected with the shell by bolts, clips, links, or other suitable connection, as is common in this class of devices. It is evident, also, that my invention may be used in other forms and arrangements of parts than those herein illustrated and described, and that the details of construction can be varied to suit the requirements of the particular structure used, the essential feature being that the truck is connected to the car-axles or their boxes by means of hinged joint-connections at one or both ends of the car, so that the floor of the car may be tilted or inclined to permit ready access to the motor, gears, and other connections under the car and the repair or replacement thereof.

Some novel features of construction are necessarily shown herein which are not claimed in this application, they being included in other applications.

What I claim is—

1. A car with its truck connected with the axles by hinged joints, substantially as described.

2. A car with its truck suspended beneath the axles by four hinged joints, substantially as described.

3. A car with its truck supported in four stirrups forming parts of the hinged joint-connections, substantially as described.

4. A car with its axle-box forming part of a hinged joint supporting the truck, substantially as described.

5. A car with its truck supported in stirrups forming part of a hinged joint connected to the axle-boxes, forming the complementary parts of the hinged joints, substantially as described.

6. A car with its body connected with the truck by means of a joint or joints, permitting one end of the car-body to be raised to disconnect it from its axle-boxes at that end, while the other end of the car remains in connection with the axles and swings thereon, substantially as described.

7. A car having a motor supported on its axle and truck, the car-body being connected with the truck by means of hinged joints, whereby the car-body may be tilted on one of its axles and the motor and other axle withdrawn from under the car, substantially as described.

8. A motor-car with its truck suspended beneath the axles and with the axle-boxes between the jaws of pedestals secured to the car-body, the truck being so connected with the axle-boxes as to permit one end of the car-body to be elevated and the axle with its wheels and appendages removed from under the car, while the other end of the car retains its connection with the truck, substantially as described.

9. A motor-car having one end of its motor connected to the car-axle and the other end connected by a single bolt to a goose-neck centrally supported upon the car-truck body, substantially as described.

10. A motor-car having its motor connected with the axle and with the truck-frame by a single bolt, the truck being connected to the axle by two hinged joints having removable joint-bolts, substantially as described.

11. A car having a motor on its axle connected with the truck-frame by a bolt at each axle-box and a bolt holding the motor-nose at the middle of the truck-frame, which three bolts now named when withdrawn permit removal of the axle with its wheels and motor, substantially as described.

In testimony whereof I have signed my name to this specification in the presence of two subscribing witnesses.

JOHN STEPHENSON.

Witnesses:
   JOSEPH B. STEPHENSON,
   S. A. STEPHENSON.